United States Patent
Raghavan (10) Patent No.: US 9,032,143 B2
(45) Date of Patent: May 12, 2015

(54) ENHANCED MEMORY SAVINGS IN ROUTING MEMORY STRUCTURES OF SERIAL ATTACHED SCSI EXPANDERS

(75) Inventor: Ramprasad Raghavan, Maharashtra (IN)

(73) Assignee: LSI Corporation, Milpitas, CA (US)

( * ) Notice: Subject to any disclaimer, the term of this patent is extended or adjusted under 35 U.S.C. 154(b) by 269 days.

(21) Appl. No.: 13/602,498

(22) Filed: Sep. 4, 2012

(65) Prior Publication Data

US 2014/0068177 A1 Mar. 6, 2014

(51) Int. Cl.
*G06F 12/00* (2006.01)
*G06F 13/36* (2006.01)
*G06F 13/40* (2006.01)
*G06F 13/00* (2006.01)

(52) U.S. Cl.
CPC ............ *G06F 13/36* (2013.01); *G06F 13/4022* (2013.01); *G06F 2213/0028* (2013.01)

(58) Field of Classification Search
CPC .............................. G06F 12/00; G06F 13/404
USPC .......................... 711/100, 108, 118, 154, 200
See application file for complete search history.

(56) References Cited

U.S. PATENT DOCUMENTS

| | | | |
|---|---|---|---|
| 7,171,500 B2 * | 1/2007 | Day et al. ................. | 710/106 |
| 7,334,042 B2 * | 2/2008 | Day et al. ................. | 709/230 |
| 7,412,540 B2 | 8/2008 | Seto et al. | |
| 7,668,925 B1 | 2/2010 | Liao et al. | |
| 7,990,961 B2 | 8/2011 | Petty | |
| 8,539,135 B2 | 9/2013 | Kabra et al. | |
| 2006/0039406 A1 | 2/2006 | Day et al. | |
| 2006/0041672 A1 | 2/2006 | Day et al. | |
| 2006/0041699 A1 | 2/2006 | Day et al. | |
| 2009/0006697 A1 | 1/2009 | Doherty et al. | |
| 2010/0215041 A1 | 8/2010 | Petty | |
| 2012/0173840 A1 | 7/2012 | Patel et al. | |

* cited by examiner

*Primary Examiner* — Tuan Thai
(74) *Attorney, Agent, or Firm* — Duft Bornsen & Fettig LLP

(57) ABSTRACT

Methods and structure are provided for representing ports of a Serial Attached SCSI (SAS) expander circuit within routing memory. The SAS expander includes a plurality of PHYs and a routing memory. The routing memory includes entries that each indicate a set of PHYs available for initiating a connection with a SAS address, and also includes an entry that represents a SAS port with a start tag indicating a first PHY of the port and a length tag indicating a number of PHYs in the port. The SAS expander also includes a Content Addressable Memory (CAM) including entries that each associate a SAS address with an entry in the routing memory. Further, the SAS expander includes a controller that receives a request for a SAS address, uses the CAM to determine a corresponding routing memory entry for the requested SAS address, and selects the port indicated by the corresponding routing memory entry.

20 Claims, 5 Drawing Sheets

ENHANCED MEMORY SAVINGS IN ROUTING MEMORY STRUCTURES OF SERIAL ATTACHED SCSI EXPANDERS

BACKGROUND

1. Field of the Invention

The invention relates generally to Serial Attached SCSI (SAS) and more specifically relates to improved routing within SAS expanders.

2. Discussion of Related Art

In Serial Attached SCSI (SAS) systems, initiators (e.g., storage controllers implemented as Host Bus Adapters (HBAs)) manage the operations of one or more targets (e.g., storage devices or other functional circuitry components). SAS expanders couple the various SAS devices, forming a switched fabric through which point-to-point connections can be routed from initiators to targets. SAS expanders generally include physical links that are configured as logical ports, and generally also include switching circuitry and logic. A typical SAS expander can be configured to temporarily couple any of its ports to any other of its ports in order to establish a connection between devices. For example SAS standards allow for ports that consist of a single physical link ("narrow ports"), and also allow for "wide ports" made from multiple physical links that are logically configured together as a single entity. A wide port can enable greater bandwidth in communications between devices than a narrow port.

When communications are routed through a switched SAS fabric from an initiator to a target, each SAS expander receiving the communication consults routing information in memory in order to determine how to establish a connection to send the communication to its final destination. Because high levels of performance in SAS systems are generally desirable, routing information in a SAS expander may be accessed via a Content-Addressable Memory (CAM) (i.e., special hardware). The CAM can link SAS addresses with entries in memory, each entry in memory showing available ports of the expander that can be used to initiate a connection with a corresponding SAS address. For example, entries in the CAM may be pointers to entries in Random Access Memory (RAM) that list such available ports.

The RAM entries indicate which ports of the expander may be used to route an incoming communication to a requested SAS address. For example, there may be a unique RAM entry for each possible SAS address. Each entry may include a series of bits, and each bit may represent whether a corresponding PHY of the expander (i.e., a physical link along with associated transceiver elements and logic) can be used to route to that SAS address. When a wide port can be used to route requests through the SAS expander, the bit for each PHY of the wide port may be individually marked as available.

While CAMs provide a substantial performance benefit for routing functions in SAS expanders, CAMs remain expensive to implement, even for small amounts of memory (e.g., even several kilobytes). Furthermore, CAM and RAM structures used for routing take up valuable die space on SAS expanders that are produced as integrated circuits, which undesirably increases the size and cost of those SAS expanders. Still further, as the number of ports in a SAS expander increases, the size of these routing memory resources increases, and this adds to the cost and complexity of the expander.

Thus it is an ongoing challenge to balance competing objectives of value and performance when implementing routing memory structures in a SAS expander.

SUMMARY

The present invention addresses the above and other problems, thereby advancing the state of the useful arts, by providing methods and structure for representing ports in routing memory (e.g., routing RAM) of a SAS expander in a space efficient manner. Specifically, if an entry in the routing memory indicates that a port is available, the port may be represented within the entry using a start tag (indicating a first PHY of the port) and another tag (e.g., a length tag indicating a number of PHYs in the port or a stop tag indicating the last PHY in the port). Using tags to represent routing information reduces the amount of memory used, especially in regards to SAS wide ports.

In one aspect hereof, a Serial Attached SCSI (SAS) expander circuit is provided. The SAS expander comprises a plurality of physical links with transceivers (PHYs). The SAS expander further comprises a routing memory including entries that each indicate a set of the PHYs available for initiating a connection with a SAS address, the routing memory including an entry that represents a SAS port with a start tag indicating a first PHY of the port and a length tag indicating a number of PHYs in the port. Further, the SAS expander comprises a Content Addressable Memory (CAM) including entries that each associate a SAS address with an entry in the routing memory. Additionally, the SAS expander includes a controller operable to receive a request that identifies a SAS address, further operable to use the CAM to determine a corresponding routing memory entry for the identified SAS address, and further operable to select the port indicated by the corresponding routing memory entry in order to initiate a connection with the identified SAS address.

Another aspect hereof provides another SAS expander circuit. The SAS expander comprises a plurality of physical links with transceivers (PHYs). The SAS expander further comprises a routing memory including entries that each indicate a set of the PHYs available for initiating a connection with a SAS address, the routing memory including an entry that represents a SAS port with a start tag indicating a first PHY of the port and a stop tag indicating a last PHY in the port. Further, the SAS expander comprises a Content Addressable Memory (CAM) including entries that each associate a SAS address with an entry in the routing memory. Additionally, the SAS expander includes a controller operable to receive a request that identifies a SAS address, further operable to use the CAM to determine a corresponding routing memory entry for the identified SAS address, and further operable to select the port indicated by the corresponding routing memory entry in order to initiate a connection with the identified SAS address.

Another aspect hereof provides a method for operating a Serial Attached SCSI (SAS) expander circuit comprising a plurality of physical links with transceivers (PHYs). The method comprises receiving, at the SAS expander, a request that identifies a SAS address, and accessing a Content Addressable Memory (CAM) to identify an entry that associates the identified SAS address with an entry in routing memory of the SAS expander. The method also comprises accessing an entry in the routing memory that corresponds with the CAM entry, the entry in the routing memory representing a SAS port with a start tag indicating a first PHY of the port and a length tag indicating a number of PHYs in the port. Further, the method comprises selecting the port indicated by the corresponding routing memory entry in order to initiate a connection with the identified SAS address.

Another aspect hereof provides a Serial Attached SCSI (SAS) expander circuit. The expander comprises a plurality of physical links with transceivers (PHYs), and a routing memory including entries that each indicate a set of the PHYs forming a port available for initiating a connection to a SAS address. The expander further comprises a Content Addressable Memory (CAM) including entries that each associate a SAS address with an entry in the routing memory, wherein multiple entries in the CAM correspond with a single entry in the routing memory, and a control unit operable to receive a request that identifies a SAS address. The control unit is further operable to use the CAM to determine a corresponding routing memory entry for the identified SAS address, and to select the port indicated by the corresponding routing memory entry in order to initiate a connection with the identified SAS address.

DETAILED DESCRIPTION OF THE DRAWINGS

Figure 1:
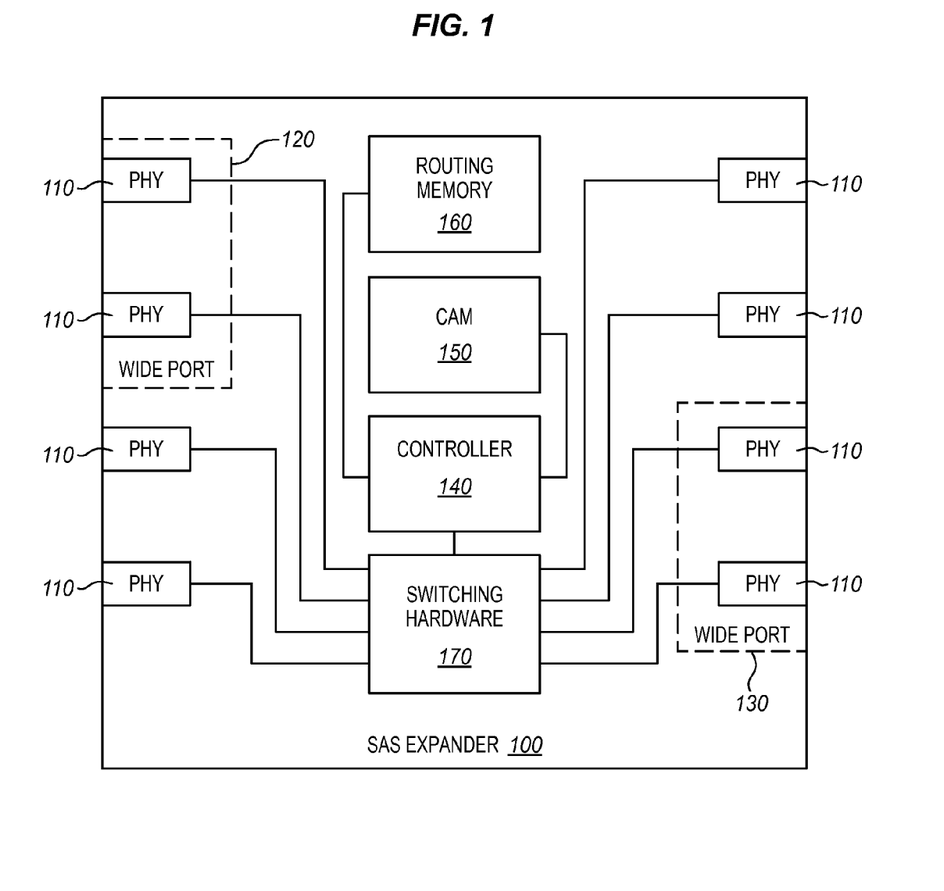
FIG. 1 is a block diagram of an exemplary enhanced SAS expander in accordance with features and aspects hereof

FIG. 1 is a block diagram of an exemplary enhanced Serial Attached SCSI (SAS) expander 100 in accordance with features and aspects hereof. SAS expander 100 may operate in a SAS domain (i.e., an electronic system implementing SAS) to establish connections between various SAS initiators and targets in order to enable communications between those devices. In one embodiment, expander 100 is implemented as a single Integrated Circuit (IC).

SAS expander 100 includes multiple PHYs 110 (i.e., physical links, along with their associated transceivers and logic) that may be used to establish connections between SAS devices. For example, SAS expander 100 may include 64, 128, 256, or any arbitrary number of PHYs 110. Each PHY 110 may be connected to a SAS device such as another SAS expander, a SAS initiator, or a target device. In this manner, SAS expander 100 may be integrated into a switched fabric for a given SAS domain.

SAS expander 100 also includes wide ports 120 and 130. In accordance with SAS specifications (e.g., SAS version 2, revision 16, published Apr. 18, 2009 by the T-10 technical committee and herein incorporated by reference), wide ports 120-130 are logical constructs that enable SAS expander 100 to use multiple PHYs as a single logical port for routing communications between devices. Using wide ports can serve to enhance overall throughput for a connection, reduce latency for that connection, etc. Depending upon the internal logic implemented at SAS expander 100, SAS expander 100 may configure its various PHYs into any combination of wide ports or narrow ports (which comprise only a single PHY).

SAS expander 100 also includes controller 140, which manages the routing operations performed by switching hardware 170. Controller 140 may be implemented, for example, as custom circuitry and components that implement logic for performing the routing functions of a SAS expander as well as performing the enhanced routing functions described herein. Implementing controller 140 as hardware allows SAS expander 100 to provide a level of speed and performance desired in facilitating communications between SAS devices.

As well understood in the art, Content Addressable Memories (CAMs) such as CAM 150 are a special type of computer memory used in certain very high speed searching applications. CAM 150 includes multiple entries (e.g., one entry for each SAS address implemented in the SAS domain). Each entry of CAM 150 has a CAM address (e.g., a key value) and CAM data (e.g., a data value associated with that key value). Typically, the CAM address will comprise the requested SAS address. The CAM data may comprise indicia to identify an entry in routing memory 160 that corresponds with the SAS address. For example, the CAM data in a given entry may be a full memory address pointer to routing memory, an address offset from a pre-determined base address in routing memory, an index of the entry in an array of fixed size entries stored in routing memory, or other suitable indicia. The die size area used for the CAM may be reduced by use of such offset or index values rather than full memory address pointer values.

It should be appreciated that CAM 150, because it is content-addressable, is substantially faster at performing lookups than a general purpose processor that implements routing logic. This means that CAM 150 provides a substantial speed benefit over general-purpose processors when determining where to look in routing memory 160. In SAS routing operations, providing this enhanced level of speed remains desirable because it prevents SAS routing functions from hampering the overall operation of the SAS domain.

Routing memory 160 may comprise Random Access Memory (RAM) or other suitable high-speed memory such as a register file. Routing memory 160 includes multiple entries. Each entry indicates the PHYs that are available for routing an incoming request to one or more destination SAS addresses. For example, one entry may exist for each SAS address in the SAS domain that SAS expander 100 is located within. In another example, SAS addresses that have the same routing information may use the same entry in routing memory 160.

In this embodiment, routing memory 160 has been enhanced to take up less space, which in turn reduces its size when implemented on a circuit die. Specifically, each port in routing memory 160 can be represented using two separate tags (e.g., two separate sets of bits used as indicators). For example, the first tag may indicate which PHY of the expander is the "start" of the port, and the second tag may indicate how many PHYs are in the port. Alternatively, the second tag could be a "stop" tag that indicates the last PHY in the port. Using tags in this manner takes up substantially less space than prior techniques, wherein the availability of each and every PHY in the SAS expander was independently indicated with a single bit. The size of each tag may, for example, be equal to $\log_2$ of the number of PHYs in the expander (rounded up to the nearest whole number), or may potentially be larger.

When an incoming connection request, such as an Open Address Frame (OAF), is received at a PHY 110, controller 140 is operable to review the request to identify a destination SAS address. Controller 140 then consults CAM 150 to find an entry corresponding to the requested destination SAS address (e.g., by using the SAS address as a key value to access an entry in CAM 150). CAM data in the entry may then be used to identify one or more appropriate entries in routing memory 160. Controller 140 may then access an identified entry in routing memory 160. For example, controller 140 may utilize a pointer stored in the CAM entry that points to the appropriate entry in routing memory 160.

The entry in routing memory 160 includes data indicating which ports are available for routing to the requested SAS address. Thus, controller 140 may use one or more of the ports listed in the entry in order to establish a connection with the requested SAS address.

Controller 140, upon referencing routing memory 160 to determine which ports are available to initiate a connection with the destination address, may configure switching hardware 170 to connect the request to any one of the available ports. Switching hardware 170 may comprise any suitable components for switching connections between PHYs 110 of SAS expander 100. For example switching hardware 170 may comprise a crossbar switch.

Note that the particular arrangement of components described herein is merely intended to be exemplary, and one of ordinary skill in the art will appreciate that the specific arrangement and configuration of expander components is merely a matter of design choice.

Figure 2:
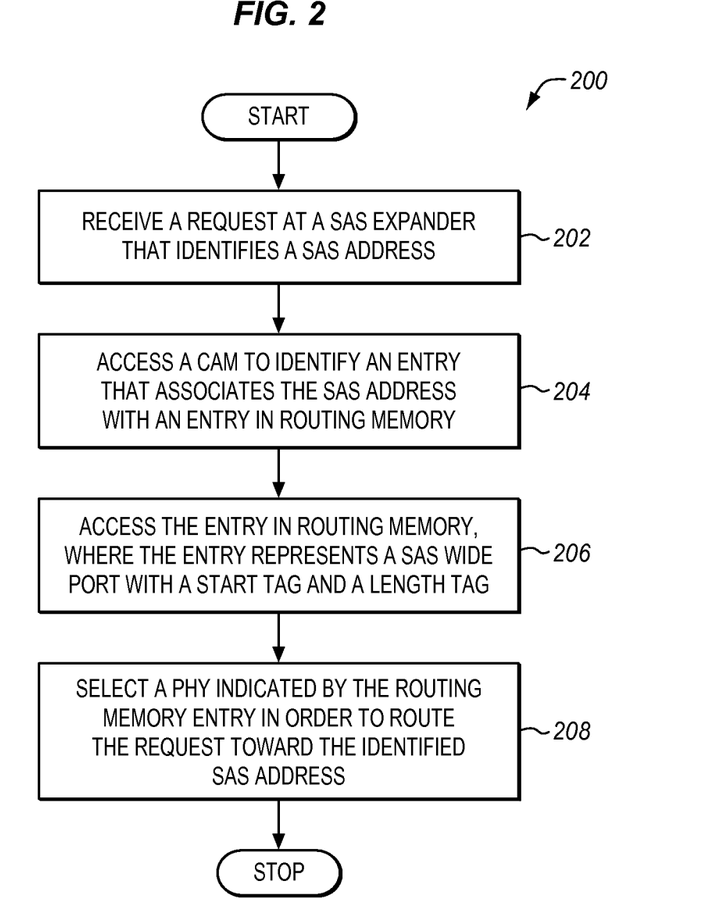
FIG. 2 is a flowchart describing an exemplary method in accordance with features and aspects hereof to operate an enhanced SAS expander.

FIG. 2 is a flowchart describing an exemplary method 200 in accordance with features and aspects hereof to operate an enhanced SAS expander. The method of FIG. 2 may be operable in a SAS domain such as described above with regard to FIG. 1. The steps of the flowcharts described herein are not all inclusive and may include other steps not shown. The steps described herein may also be performed in an alternative order.

According to FIG. 2, in step 202 a SAS expander receives a connection request that identifies a SAS address. This request may comprise, for example, an Open Address Frame (OAF) sent by a SAS initiator to establish a connection with a SAS target. Typically, the request will be received at a PHY of the SAS expander, and the request will then be processed by a controller at the expander in order to determine a destination SAS address for the request.

In step 204, the SAS expander accesses a CAM to identify an entry in the CAM that associates the SAS address with an entry in routing memory. This may comprise, for example, using the destination SAS address to identify an entry in the CAM. Once the appropriate CAM entry has been identified, the method may further include accessing CAM data in the CAM entry and following a pointer (or other suitable indicia) in the CAM data to the appropriate entry in routing memory.

Step 206 comprises accessing the entry in routing memory. The entry in routing memory identifies one or more ports that are available for routing, and includes two tags (e.g., a start tag and a length tag, or a start tag and a stop tag). A start tag indicates which PHY is the first PHY of the port, and a length tag indicates how many PHYs are in the port. A stop tag indicates the final PHY in the port. By processing the tags in the entry in routing memory, the SAS expander can determine which PHYs are available to route the request to (i.e., to establish/initiate a connection with) the destination SAS address. Using this information, the expander can use the PHYs of the indicated port to route the request towards (i.e., establish/initiate a connection with) the requested device.

In step 206, the SAS expander selects one of the ports indicated by the routing memory, and proceeds to establish a connection with an identified SAS address via the selected port. This may comprise operating switching hardware within the SAS expander in order to establish a connection between the port that received the request and a selected port that is indicated as available in the routing memory.

Figure 3:
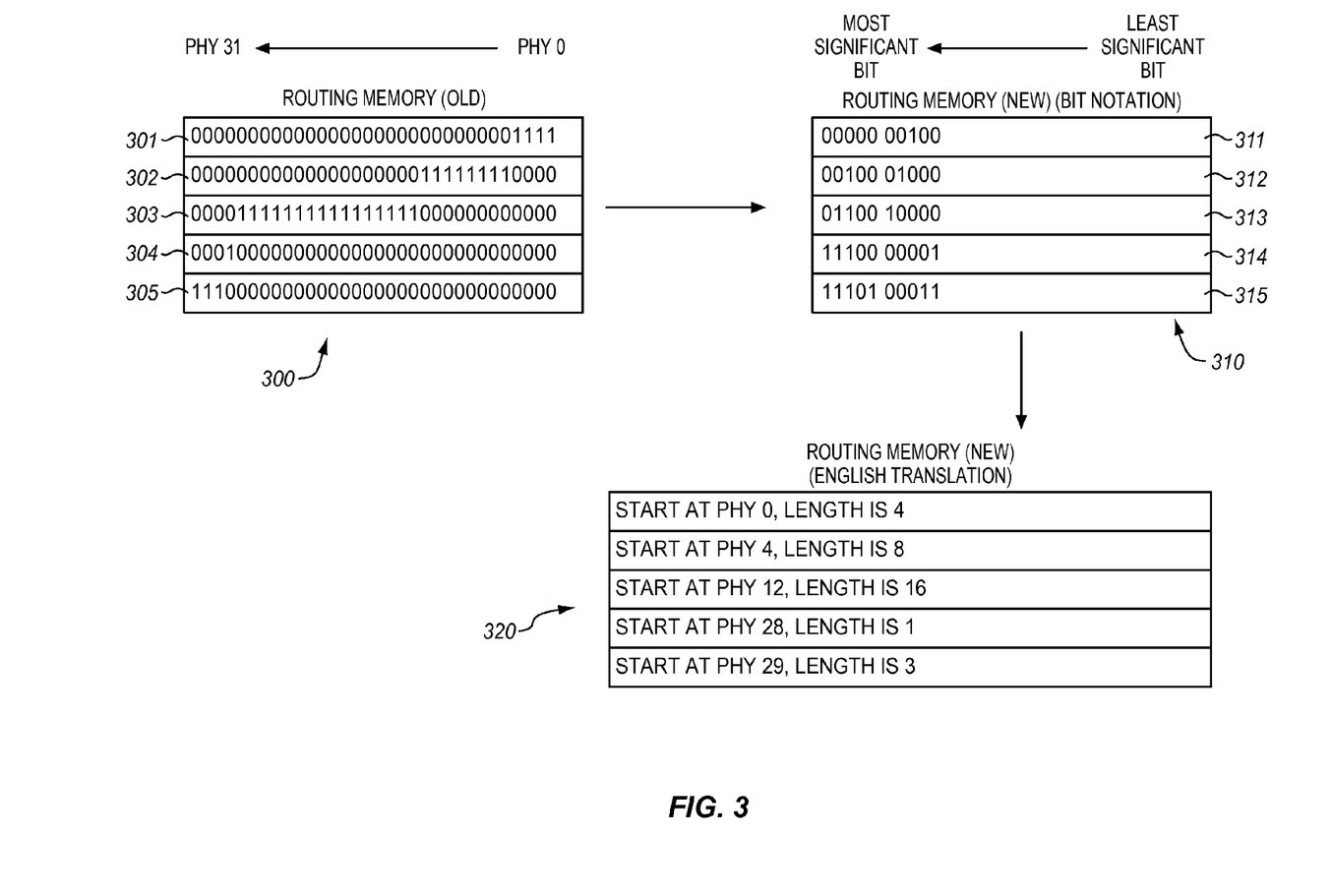
FIG. 3 is a block diagram illustrating an exemplary old version and new version of entries in routing memory for a SAS expander in accordance with features and aspects hereof.

FIG. 3 is a block diagram illustrating an exemplary old version 300 and new version 310 of entries in routing memory for a SAS expander in accordance with features and aspects hereof. Table 320 is provided to show an English translation of the bit patterns indicated in entries 311-315. According to FIG. 3, five entries 301-305 are shown as they would appear on a prior SAS expander that includes thirty two PHYs. The availability of each PHY for routing a request towards the SAS address for each of entries 301-305 is indicated with a single bit. Thus, each of entries 301-305 occupies thirty two bits of memory. Entries 311-315 indicate the same availability of ports as in corresponding entries 301-305, but use the encoding features and aspects described herein to reduce the size of such memory in the circuit die for the SAS expander.

For example, entry 301 indicates that PHYs 0-3 form a wide port that can be used to establish a connection with a SAS address (because each of bits 0-3 is set to "1"). Entry 311 also indicates that PHYs 0-3 are available, by using a first five bits as a start tag, and a second five bits as a length tag. The start tag, when read in binary, indicates that the first PHY is PHY number 0, and the length tag, when read in binary, indicates that the length of the wide port is four PHYs. Similarly, entry 302 indicates a wide port starting at PHY 4 and ending at PHY 11. Entry 312 does the same thing, but uses five bits to indicate that the starting PHY is PHY 4, and uses five bits to indicate that the wide port is eight PHYs long. Entries 303 and 313, 304 and 314, and 305 and 315 correspond in a similar manner. Entry 314 indicates how a narrow port can be encoded using this encoding scheme.

The entries provide a substantial benefit in terms of size of memory, because they utilize ten bits instead of thirty-two to indicate which PHYs are available. This benefit scales dramatically as the number of PHYs in the expander increases. For example, Table 1 below shows an example of savings in memory using this encoding scheme (where K is one kilobit).

TABLE 1

Savings in Routing Memory Due to Encoding Scheme

| PHYs in Expander | Current Routing Memory Size (Bits) | New Routing Memory Size (Bits) | Percentage Reduction in Routing Memory Size |
|---|---|---|---|
| 64 | 2K*64 | 2K*12 | 81 |
| 128 | 2K*128 | 2K*14 | 89 |
| 256 | 2K*256 | 2K*16 | 93.8 |
| N | 2K*N | 2K*log2(N)*2 | (N − log2(N)*2)/N*100 |

Note that, according to FIG. 3, the tag notation can be used to indicate narrow ports (i.e., ports that include only one PHY) as well as wide ports without any modification. Using a uniform encoding scheme for both wide ports and narrow ports means that the entries in routing memory can be easily referenced with an index (because each entry takes up the same number of bits). This also means that logic used by a controller of the expander to decode the entries can be the same regardless of whether the entry represents a wide port or a narrow port. The decoding process may involve, for example, decoding an entry in routing memory into a bit mask. Such a process may include creating a temporary bit mask of N bits, where N is the number of ports in the expander. The method may further include setting each of the bits to zero, then setting the bit starting at the start tag to "1", as well as setting the following bits to "1" for the length of the length tag.

Another example of such a process may involve the following logical method to decode an entry: set a counter to one. Read the start tag in binary to determine a number of a first PHY of the port. Set the corresponding bit in the bit mask to "1". Read the length tag in binary to determine the length of the port. If the length is one, then set the remaining bits of the mask to "0" and end. Otherwise, enter a loop. In the loop, set the bit corresponding to a next PHY (i.e., an adjacent bit to the one that was previously set) to "1". Then increment the counter by one. If the counter is equal to the length, then exit the loop. Loop until the port is fully represented. Then set the remaining bits of the mask to "0" and end.

Figure 4:
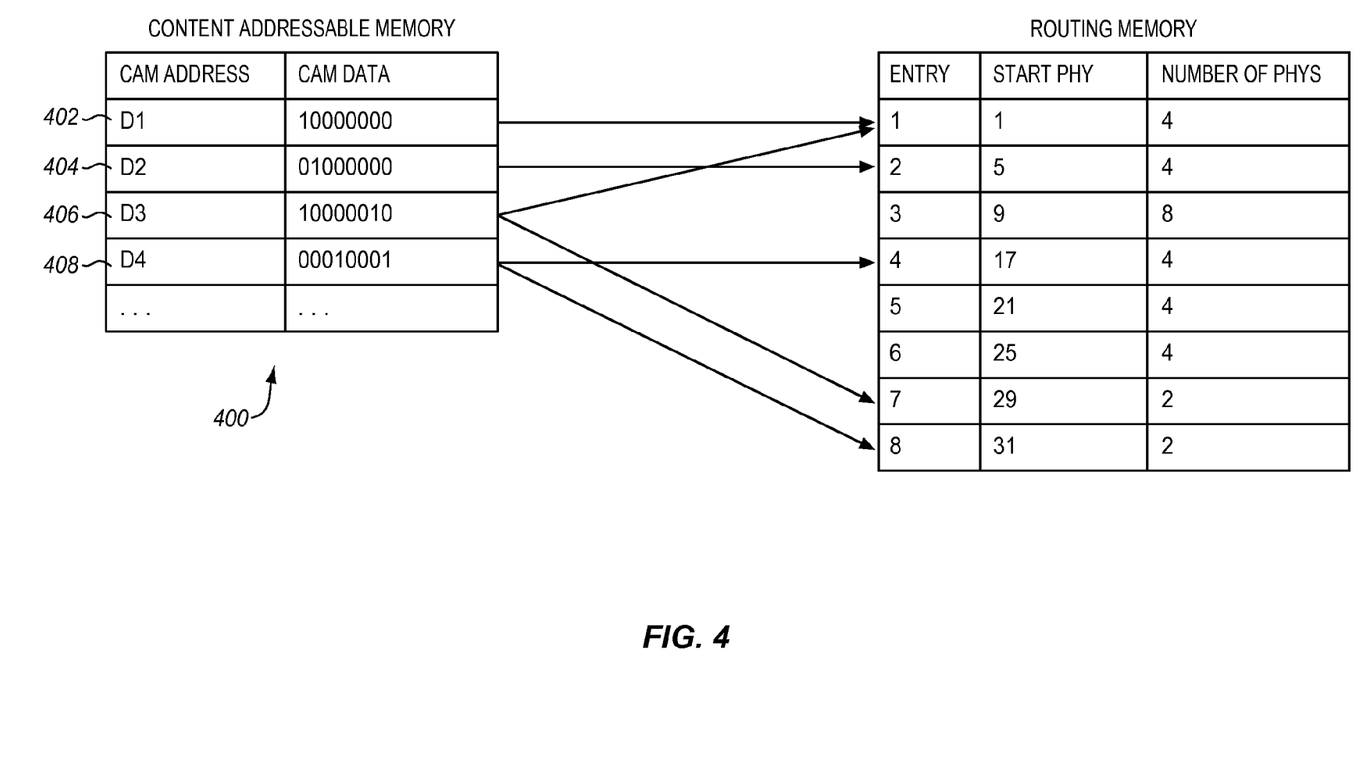
FIG. 4 is a block diagram illustrating an exemplary CAM with entries that each reference one or more entries in routing memory for a SAS expander in accordance with features and aspects hereof.

FIG. 4 is a block diagram illustrating an exemplary CAM 400 in another embodiment. CAM 400 includes entries 402-408. Each entry in CAM 400 references one or more entries in routing memory (herein, RAM) for a SAS expander in accordance with features and aspects hereof. This may be desirable for situations where multiple routing paths are available to route communications to a single destination SAS address.

According to FIG. 4, CAM 400 of the SAS expander has been implemented so that each entry in the CAM data no longer includes a pointer to a specific single entry in the routing memory. Instead, the CAM data includes a bit mask. Each bit in the bit mask indicates an entry in the routing memory. Thus, each entry in the CAM can indicate one or more routing memory entries at the same time. The number of bits in such a CAM data could therefore be equal to the number of entries in routing memory (instead of the number of SAS addresses in the SAS domain).

In this embodiment, multiple possible routes are available for a given SAS address. A controller of the SAS expander may then perform logical operations to combine the entries in routing memory that were indicated by the CAM data. For example, the controller may translate all of the indicated entries in routing memory into bit masks, and may then use a logical OR to combine the bit masks, thereby generating a list of available PHYs for routing. If the combined list of available PHYs comprises multiple separate ports, the controller may implement logic to select from the possible ports to establish a connection with the destination device. For example, the controller may use a wide port or a narrow port depending on any reasonable criteria.

A SAS expander may utilize alternative or further memory-saving enhancements. For example, consider SAS devices which are all separated from the SAS expander via another expander. To establish a connection with any of these devices, the same port can be used (because all of the devices can be reached through the port coupled with the other expander). As such, having a unique entry in routing memory for each SAS device becomes redundant. Therefore, to reduce the size of routing memory, the routing memory may utilize a unique entry for each port of the expander—instead of a unique entry for each potential destination SAS address.

When the SAS expander includes a routing memory with an entry for each port located at the expander, multiple CAM entries can be used to reference a single entry in routing memory (e.g., entries 402 and 406 of FIG. 4). This in turn saves substantial space in routing memory itself, because it reduces the number of entries from one per possible SAS address in the SAS domain down to one entry per port (wide or narrow) included on the expander.

A CAM using a bit mask such as described for FIG. 4 may be used in order to allow for multiple potential routing paths per destination SAS address. Alternatively, if a single route is defined for each destination SAS address, the CAM may use pointers or other indicia to link each destination SAS address with a single entry in the routing memory.

Figure 5:
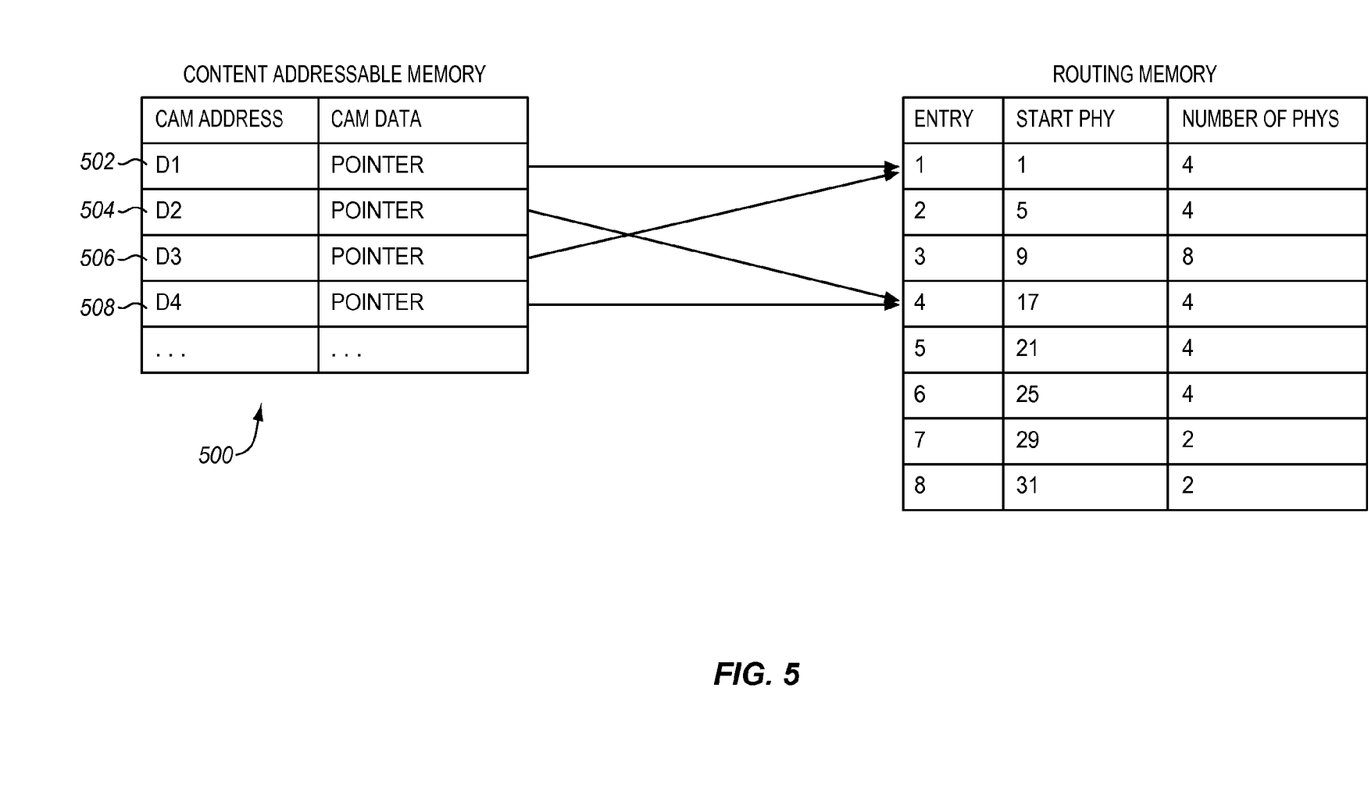
FIG. 5 is a block diagram illustrating an exemplary CAM using pointers to reference entries in routing memory in accordance with features and aspects hereof.

FIG. 5 is a block diagram illustrating an exemplary CAM using pointers to reference entries in routing memory in accordance with features and aspects hereof. Note that in FIG. 5, CAM entries 502-508 use pointers to indicate single entries in routing memory. Because each entry in the routing memory represents a port and not a destination SAS address, the routing memory may be beneficially smaller.

The potential memory savings of embodiments where entries in routing memory each indicate a port instead of indicating ports that are available to route to a specific SAS address can be enormous. This is because the number of entries in routing memory scales down from thousands of potential SAS addresses to a mere tens (or hundreds) of ports on the SAS expander. This is true even in subtractive routing scenarios where a single subtractive port is included in the SAS expander for routing requests that do not have entries in routing memory. In fact, these memory savings can also be achieved in table and direct attached routing. For direct attached routing, however, the generation of tags discussed above may preferably be performed in hardware.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander circuit comprising:
    a plurality of physical links with transceivers (PHYs);
    a routing memory including entries that each indicate a set of the PHYs available for initiating a connection with a SAS address, the routing memory including an entry that represents a SAS port with a start tag indicating a first PHY of the port and a length tag indicating a number of PHYs in the port;
    a Content Addressable Memory (CAM) including entries that each associate a SAS address with an entry in the routing memory; and
    a controller operable to receive a request that identifies a SAS address, further operable to use the CAM to determine a corresponding routing memory entry for the identified SAS address, and further operable to select the port indicated by the corresponding routing memory entry in order to initiate a connection with the identified SAS address.

2. The SAS expander of claim 1 wherein:
    the size of the start tag for the entry, in bits, is equal to $\log_2$ of the number of PHYs in the expander rounded up to the nearest whole number.

3. The SAS expander of claim 1 wherein:
    the size of the length tag for the entry, in bits, is equal to $\log_2$ of the number of PHYs in the expander rounded up to the nearest whole number.

4. The SAS expander of claim 1 wherein:
    the SAS expander operates in a SAS domain; and
    the routing memory includes an entry for each SAS address in the SAS domain.

5. The SAS expander of claim 1 wherein:
    the controller further includes logic to transform the start tag and the length tag of the entry in routing memory into a bit mask that indicates the PHYs of the port.

6. The SAS expander of claim 1 wherein:
    each entry in the CAM includes a bit mask, each bit of the mask indicating an entry in the routing memory.

7. The SAS expander of claim 6 wherein:
the controller is further operable to combine the indicated entries to determine which ports are available to initiate a connection with the identified SAS address.

8. The SAS expander of claim 7 wherein:
the controller is further operable to combine the indicated entries by combining the available PHYs for each the indicated entries.

9. The SAS expander of claim 1 wherein:
the routing memory includes an entry for each port in the SAS expander.

10. A method for operating a Serial Attached SCSI (SAS) expander circuit comprising a plurality of physical links with transceivers (PHYs), the method comprising:
receiving, at the SAS expander, a request that identifies a SAS address;
accessing a Content Addressable Memory (CAM) to identify an entry that associates the identified SAS address with an entry in routing memory of the SAS expander;
accessing an entry in the routing memory that corresponds with the CAM entry, the entry in the routing memory representing a SAS port with a start tag indicating a first PHY of the port and a length tag indicating a number of PHYs in the port; and
selecting the port indicated by the corresponding routing memory entry in order to initiate a connection with the identified SAS address.

11. The method of claim 10 wherein:
the size of the start tag for the entry, in bits, is equal to $\log_2$ of the number of PHYs in the expander rounded up to the nearest whole number.

12. The method of claim 10 wherein:
the size of the length tag for the entry, in bits, is equal to $\log_2$ of the number of PHYs in the expander rounded up to the nearest whole number.

13. The method of claim 10 wherein:
the SAS expander operates in a SAS domain; and
the routing memory includes an entry for each SAS address in the SAS domain.

14. The method of claim 10 further comprising:
transforming the start tag and the length tag of the entry in routing memory into a bit mask that indicates the PHYs of the port.

15. The method of claim 10 wherein:
each entry in the CAM includes a bit mask, each bit of the mask indicating an entry in the routing memory.

16. A Serial Attached SCSI (SAS) expander circuit comprising:
a plurality of physical links with transceivers (PHYs);
a routing memory including entries that each indicate a set of the PHYs available for initiating a connection with a SAS address, the routing memory including an entry that represents a SAS port with a start tag indicating a first PHY of the wide port and a stop tag indicating a last PHY in the port;
a Content Addressable Memory (CAM) including entries that each associate a SAS address with an entry in the routing memory; and
a controller operable to receive a request that identifies a SAS address, further operable to use the CAM to determine a corresponding routing memory entry for the identified SAS address, and further operable to select the port indicated by the corresponding routing memory entry in order initiate a connection with the identified SAS address.

17. The SAS expander of claim 16 wherein:
the size of the start tag for the entry, in bits, is equal to $\log_2$ of the number of PHYs in the expander rounded up to the nearest whole number.

18. The SAS expander of claim 16 wherein:
the size of the length tag for the entry, in bits, is equal to $\log_2$ of the number of PHYs in the expander rounded up to the nearest whole number.

19. The SAS expander of claim 16 wherein:
the SAS expander operates in a SAS domain; and
the routing memory includes an entry for each SAS address in the SAS domain.

20. The SAS expander of claim 16 wherein:
the controller further includes logic to transform the start tag and the stop tag of the entry in routing memory into a bit mask that indicates the PHYs of the port.

* * * * *